June 11, 1963 K. V. FORSBERG 3,093,201
COMPUTING MEANS FOR WEIGHING SCALES
Filed Jan. 5, 1961 3 Sheets-Sheet 3

United States Patent Office 3,093,201
Patented June 11, 1963

3,093,201
COMPUTING MEANS FOR WEIGHING SCALES
Karl Viking Forsberg, Enskede, Stockholm, Sweden, assignor to Antonsson Avery AB, Vastra Frolunda, Sweden, a corporation of Sweden
Filed Jan. 5, 1961, Ser. No. 80,768
Claims priority, application Sweden Jan. 9, 1960
8 Claims. (Cl. 177—25)

The invention relates to weighing scales. It is an object of the invention to provide improved means for computing the monetary value of a commodity at a predetermined price per unit of weight. Such means are of special interest in self-service shops where portions of commodities are weighed and wrapped in advance such that each package carries a label stating its weight and price. It is a particular object of the invention to provide a computing device which may be combined with any scale of the type including a pivotable arm which is moved in response to the weight of a load placed on the scale.

The device according to the invention comprises a movable sensing member adapted to contact the pivotable arm to sense the position thereof when the load has been placed on the scale, a price indicating mechanism including a rotatable indicating member, and an adjustable translating mechanism connecting said sensing member and said indicating member. The translating mechanism includes a first rotatable roll releasably connected to rotate in dependence on the movement of said sensing member, a second rotatable roll spaced radially from said first roll and releasably connected to said indicating member to rotate together therewith, and a strip of material stretched between the rolls and wound a plurality of turns on at least one of the rolls, said strip being adapted to transmit the rotation of the first roll to the second roll such that the relation between the angular motions of the rolls will be equal to the inverse relation between the radii of the rolls. The desired price per unit of weight is set by releasing the rolls and rewinding the strip so that the required relation between the radii of the rolls is obtained.

To make possible an automatic recording and print-of the prices of the commodities weighed, the price indicating mechanism may include an electric selector disk cooperating with selector contacts to transmit digits to a printing Comptometer. In a similar way the member following and sensing the pivotable scale indicator may be combined with another electric selector mechanism transmitting the statements of weights to said printing Comptometer.

Figure 1:
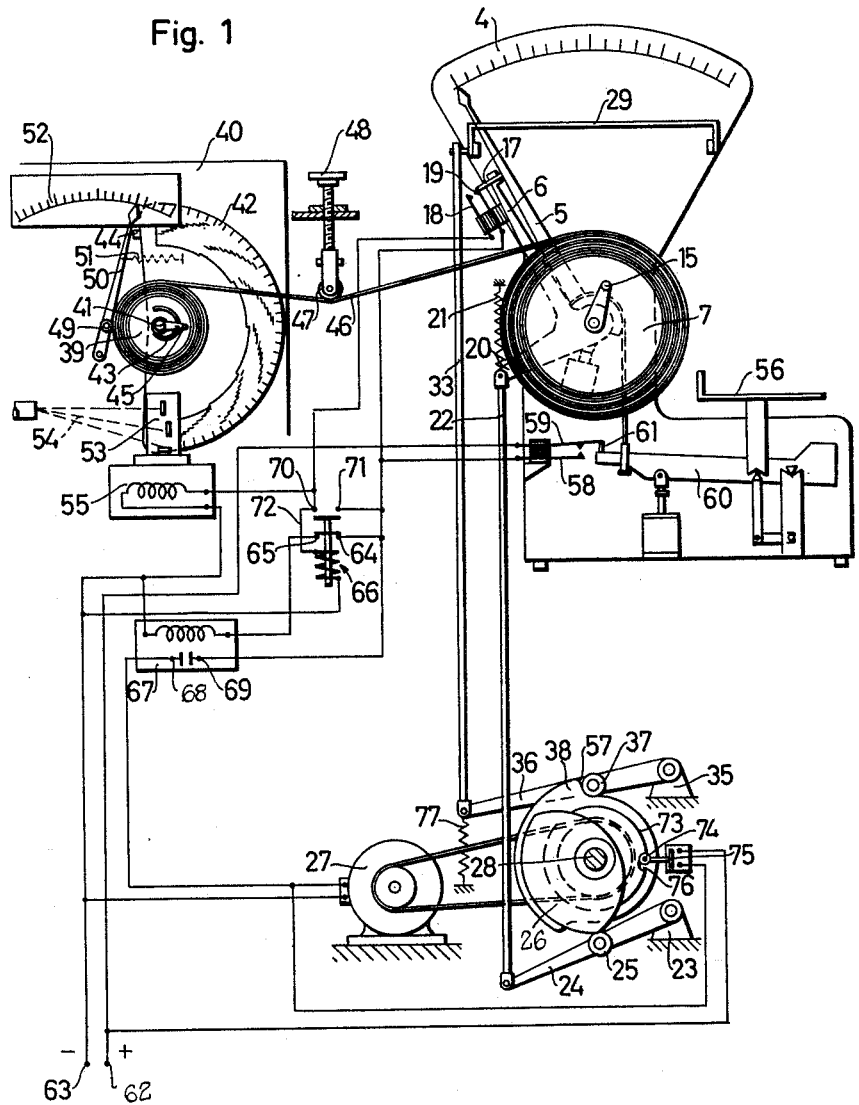
Figure 2:
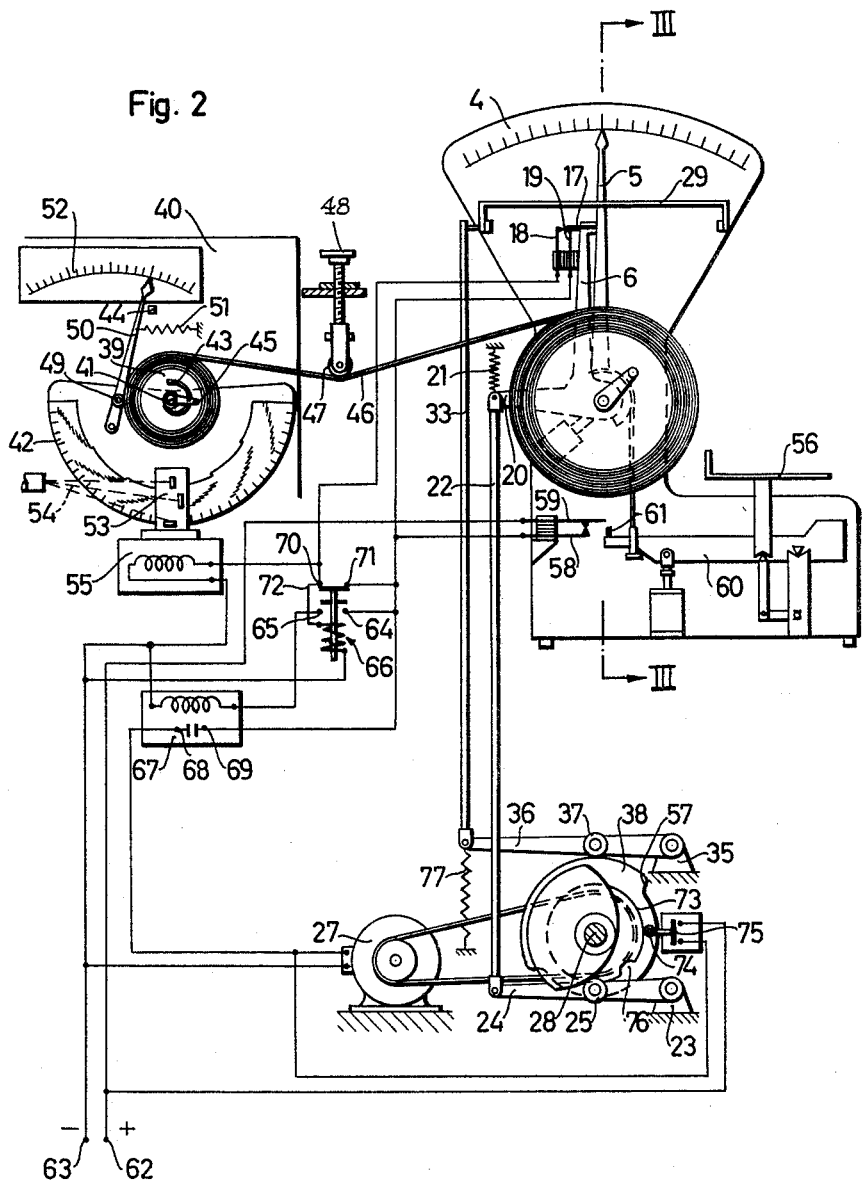
Figure 3:
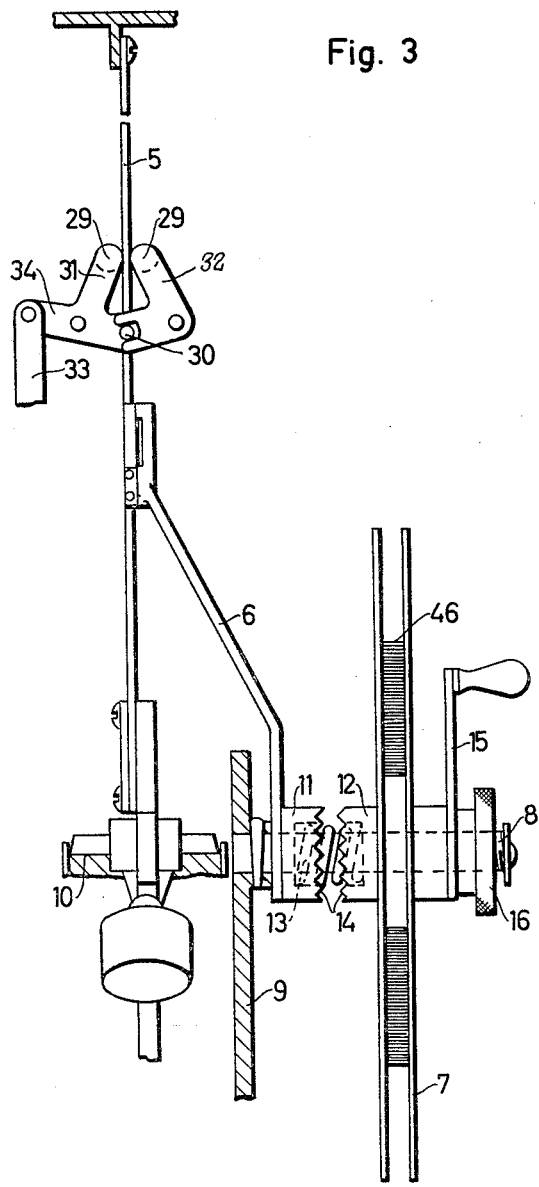

The invention will be described in detail with reference to the accompanying drawings, in which:

FIGURES 1 and 2 shows diagrammatic side elevations of an embodiment in initial position and an operative position, respectively, and FIGURE 3 shows, on a larger scale, a fragmentary section along the line III—III in FIGURE 2.

FIGS. 1 and 2 show a pendulum scale 4 which may be of a construction generally known and which therefore need not be described in detail. An arm 6 for sensing the position of the scale indicator 5 and a roll 7 are rotatably journalled on a shaft 8 (see FIG. 3). The shaft is secured to a frame plate 9 and is in axial alignment with the axis of rotation of the indicator 5, i.e., the edge line 10 in FIG. 3. The sensing arm 6 and the roll 7 are each supported by a hub sleeve 11 and 12, respectively. The ends of the hub sleeves facing each other have central recesses forming annular spaces around the shaft to receive a spring 13 which urges the sleeves apart. Around the recesses the ends of the sleeves are toothed at 14 to form clutch members. A crank 15 is secured to the sleeve 12 at the outside of the roll 7 and a nut 16 is screwed on the threaded outer end of the shaft 8. In the position shown in FIG. 3, the nut 16 is screwed back to permit the clutch members 14 to disengage each other so that the roll 7 can be rotated separately by means of the crank 15. A certain desired braking effect is obtained by means of the spring 13 which forces the hub sleeve 12 of the roll 7 against the inner end surface of the nut 16. When tightening the nut, the clutch members 14 are connected so that the sensing arm 6 and the roll 7 will form a rotary unit.

The sensing arm 6 is bent such that the upper portion thereof is located in the plane of rotation of the indicator 5 (see FIG. 3). Said upper portion which is designed to engage the indicator, is provided with a bore containing an easily movable pin 17 directed towards the indicator. Behind the end of the pin remote from the indicator the arm 6 carries two normally open electric contacts 18, 19. The contact 19 next to the pin 17 is secured to a weak spring which engages the pin to hold it normally in a protruded position. When the pin hits the indicator 5 during the movement of the sensing arm, as described below, it is pushed backwards, whereby the contacts 18, 19 are closed.

The sensing arm 6 is integral with an arm 20 extending perpendicularly therefrom and in the same plane of rotation thereof. A spring 21 having one end secured to a stationary support, not shown, is mounted to pull the arm 20 upwards, i.e., to rotate it clockwise in FIGURES 1 and 2. The spring is counteracted by a vertical rod 22 having its upper end linked to the arm 20, while its lower end is linked to a substantially horizontal lever 24 which is pivoted to a stationary support 23. The lever 24 carries a cam follower 25 engaging the periphery of a cam disk 26 which is keyed to a shaft 28 driven by an electric motor 27.

When a load is placed on the dish 56, and the indicator or dial pointer 5 has assumed a corresponding position, it must be locked in this position before the sensing arm 6 contacts the same. This may be done, for instance, by means of two horizontal rod-shaped clamping members 29 provided one on each side of the indicator 5 (see also FIG. 3). The clamps 29 are carried by pivoted bell cranks 31, 32 interconnected by means of a hinge 30 to be pivoted towards and from each other. The cranks are operated by means of a vertical swivel rod 33 which has one end linked to an angular projection 34 of the crank 31, whereas its other end is connected to a lever 36 which is pivoted to a stationary support 35. A cam follower 37 mounted on the lever 36 engages the periphery of a cam 38 keyed to the shaft 28.

A roll 39 is rotatably journalled on a shaft 41 secured to a frame plate 40 at a location adjacent the scale 4. A semi-circular electric selector disk or indicator 42 is also rotatably journalled on said shaft 41. A helical spring 43 secured between the frame plate 40 and the hub of the disk 42 causes the disk or indicator 42 to rotate in counter-clockwise manner in FIGS. 1 and 2. In FIG. 1, the disk 42 has been rotated to its zero position, where it is stopped by an abutment 44 secured to the frame plate 40. A coupling of the kind described in connection with the arm 6 and the roll 7 is preferably also arranged between the disk 42 and the roll 39, whereby the latter may either be caused to rotate together with the disk or may be rotated separately by means of a crank 45.

A thin steel band 46, which may have a thickness of, for example, .2 mm., is wound in a great number of turns on the two rolls 7 and 39 and is kept taut between the rolls by means of a small pulley 47 which is adjusted by means of a set screw 48. The band 46 and the rolls 7, 39 form a movement transmitting mechanism, by means of which the angular movement of the indicator 5 may be utilized to impart to the disk 42 a proportional angular movement with adjustable proportionality. As will be described below, the sensing arm 6 performs an angular movement corresponding to the indication of the indicator 5 and when the roll 7 is caused to rotate together with the arm 6 it winds up a length of band which is a function of the angular motion as well as the radius of the roll. At the same time an exactly corresponding length of band is wound off from the roll 39. Thus, both rolls are given exactly equal peripheral movement, while their angular movements are inversely proportional to the ratio between the radii of the rolls. A desired proportionality may evidently be obtained by setting the mutual size of the radii of the rolls. For that purpose, the rolls 7 and 39 are disconnected from the arm 6 and from the disk 42 respectively, whereupon they are rotated by means of crank 15 or crank 45, so that a required length of band is transferred from one roll to the other one.

A pointer 50 which is rotatable around a fixed pivot is provided to indicate the change of the radius of the roll 39. As seen, the pointer 50 carries a small roller 49 which is caused to rest against the periphery of roll 39 through the action of a tension spring 51 mounted between pointer 50 and a stationary support. The pointer 50 indicates on a scale 52 the price per unit of weight, and the rewinding of the band 46 is carried out such that the pointer indicates the desired price per unit of weight. When this price has been set, the roll clutches are connected by tightening the nuts 16 (FIG. 3), and in case the tension of the band should change somewhat at the engagement of the teeth 14, a final adjustment is made by means of the set screw 48. At the following weighing the disk or indicator 42 connected to the roll 39 will indicate the price of the goods weighed.

The selector mechanism which is shown only diagrammatically in the drawings is of a known construction and therefore it need not be described in detail. It may be sufficient to mention that the disk 42 is provided with rows of embossed knobs located as varying distance from the periphery, and a plate 53 carries selector contacts arranged in three groups, for instance, each comprising ten contacts. Each contact is connected to a conductor, and the ten conductors from a group form a bundle 54 leading a drive mechanism pertaining to one of the drums in a Comptometer, not shown. As known, the device is such that in any position the disk 42 will place one knob opposite to one of the selector contacts in each of said contact groups. Another conductor connects the Comptometer with a contact plate (not shown) provided on the rear side of the disk 42, and the electric circuits through the selector contacts are closed, in that said rear plate and the plate 53 are moved simultaneously into contact with the disk 42 by means of an electromagnet 55.

In the initial position shown in FIG. 1, where the dish 56 is not loaded, the indicator 5 is in its zero position, and the sensing arm 6 is held immediately to the left thereof, as the cam follower 25 is positioned at the largest radius of the cam 26. The clamping members 29 are kept open because the cam follower 37 engages the cam 38 at its smallest radius immediately adjacent a steep shoulder 57, and the selector disk 42 has been rotated to its zero position by the helical spring 43. For the operation the device requires a number of electric circuits. Such circuits may be connected in a variety of ways, and the embodiment described in the following will only serve as an illustration.

A switch mounted below the scale pendulum and consisting of two cooperating contact springs 58, 59 is open in the unloaded condition of the scale, because one of said contacts is kept elevated by an abutment 61 provided on the power transmission arm 60 of the scale. The contacts 58, 59 are closed when the dish is loaded and thereby a circuit is closed from the positive terminal 62 over the contacts 58, 59, two normally closed contacts 64, 65 in a relay 66 and the energizing coil of a start relay 67 to the negative terminal 63. The start relay 67 is adapted to start the operation after a pre-determined short delay (about 1 second) which is chosen such that the indicator has time to assume its correct position. After this delay, the working contacts 68, 69 of the start relay 67 are closed so that the motor 27 is started over the contacts 58, 59 and said working contacts 68, 69. A reduction gear, not shown, is preferably inserted between the motor 27 and the driven cam shaft 28 which is rotated clockwise in the drawings. As soon as the shaft 28 begins to rotate, the roller 37 is lifted along the steep shoulder 57 onto a cam portion of larger radius and thereby the swivel rod 33 is moved upwards so that the clamping members 29 lock the indicator 5 in its position. At the same time the roller 25 moves along a descending portion of the cam 26, whereby the spring 21 is permitted to turn the sensing arm 6 until said arm is stopped by engagement with the locked indicator 5. Of course, the cam 26 is of suitable shape to permit a full turning of the arm 6, and therefore its lowest portion will leave the roller 25 in those cases where the arm 6 is stopped at an earlier stage, i.e., in a position somewhere between the extreme points of the dial of the scale.

As already mentioned, the pin 17 is pushed backwards to close the contacts 18, 19 when it strikes the indicator 5 during the forward movement of the arm 6. A circuit will then be closed over the contacts 58, 59, the contacts 18, 19, and the coil of the magnet 55, whereby the selector contacts on the plate 53 engage the knobs on the selector disk 42 which has been set in the indicating position by the band 46 (FIG. 2). Consequently, current is supplied to the comptometer for registering the value obtained. At the same time when the magnet 55 is energized, two working contacts 70, 71 of a control relay 66 are closed as result of the closing of a circuit over the contact 70, a conductor 72 and the energizing coil of the relay 66. As a consequence, the energizing circuit of the start relay 67 is broken at the contacts 64, 65 of the control relay, so that the relay 67 is switched off. FIG. 2 shows the position of the various movable parts after the operations just described.

Despite the start relay 67 being switched off, the motor 27 continues to operate owing to an arrangement hitherto not described. The cam shaft 28 carries a further cam 73 which causes a spring-loaded cam follower 74 to control a limit switch 75. In the initial position shown in FIG. 1, the roller 74 is positioned in a recess 76 in the periphery of the cam 73 and the switch 75 is open. As soon as the motor has been started, the roller 74 is lifted onto a higher portion of the cam 73 so that the switch 75 is closed and a separate circuit is established through said switch and the motor. Independently of other circuits the motor will thus continue to operate, until the cams have rotated a full turn and again the roller 74 is received in the recess 76 so that the motor circuit is broken.

The descending and rising portions of the cam 26 each occupy approximately a fourth of the periphery of the cam, while the cam portion between the peaks of said inclined portions constitutes a sector of a circle. Thus, after a rotation of at least a quarter and less than half of a turn, when the cam 26 again presses the roller 25 downwards, the sensing arm 6 returns to its initial position whereat it will remain for the rest of the cycle of operations, as the roller 25 thereafter moves along the circular portion of cam 26. Simultaneously with or shortly after the return stroke of the arm 6 the roller 37 descends onto the lower portion of the cam 38 so that the clamping members 29 release the indicator 5. To facilitate this movement the lever 36 may be biased downwardly by a tension spring 77.

When the sensing arm 6 is turned backwards, the circuit controlled by the contacts 18, 19 will immediately be opened, since the spring 19 returns into its normal position causing withdrawal of the pin 17. However, the control relay 66 is still kept closed, since a holding circuit has been established from the terminal 62 over the contacts 58, 59, the working contacts 70, 71 of the relay 66, the conductor 72 and the coil of the relay 66 to the terminal 63. Because the contact 70 is connected to a conductor between the contact 18 and the magnet 55, the latter also remains energized. However, the contacts 58, 59 are included in the excitation circuit of the magnet 55 as well as in the circuit of the control relay 66 and consequently both these circuits will be broken when the load is removed from the dish 56. As mentioned, the motor circuit is broken, as soon as the cam shaft 28 has completed a full turn, and the whole device has now returned to its initial position shown in FIG. 1. Only about 2–3 seconds are required for the whole cycle of operations described, and therefore a rather great number of weighings can be carried out per minute, especially if the goods are automatically placed on and removed from the scale.

As already mentioned, the sensing arm 6 may be connected to another electric selector mechanism which transmits the statements of weight to the same comptometer which will then be able to print the price as well as the weight on the same label. The price per unit of weight can be set separately in the Comptometer so as to be printed simultaneously with the price and weight.

A plurality of modifications of the device described are possible within the scope of the invention. For instance, the two rolls 7, 39 might be provided with other clutch means than those shown, and in their released position they may be rotated by means of a motor instead of by cranks 15, 45. The clamping members 29 may to advantage be operated by means of an electromagnet, and the electric selector mechanism as well as the whole circuit diagram may be of a different kind. Moreover, a considerably simpler and cheaper semi-automatic device suitable for small shops may be obtained, if the selector mechanism and the Comptometer are omitted and the roll 39 is instead combined with a readable dial in which case either the pointer or the dial may be connected to the roll. Of course, the pointer 50 and its scale 52 may instead be combined with the roll 7, if desired, and the scale 52 would be graduated in different manner.

What I claim is:

1. Price computing means for a weighing scale of the type wherein an indicator arm is supported for pivotal movement in response to the weight of the load on the scale, said price computing means comprising a movable sensing member adapted to sense the position of said indicator arm when a load has been placed on the scale and to rotate accordingly, an indicating mechanism including a rotatably supported indicating member, and an adjustable translating mechanism connecting said sensing member and said indicating member, said translating mechanism including a first rotatable roll releasably connected to said sensing member to rotate in dependence on the movement of said sensing member, a second rotatable roll spaced radially from said first roll and releasably connected to said indicating member to rotate together therewith, and a strip of material of substantially greater length than the distance between the rolls and extending between the rolls and in wound relation thereon, said strip being adapted to transmit the rotation of the first roll to the second roll in such a way that the relation between the angular motions of the rolls will be equal to the inverse ratio of the radii of the material on the rolls, a desired price per unit of weight being adapted for being set by releasing the rolls and winding the strip on the rolls so as to obtain a required relation between the radii of the material on the rolls.

2. Price computing means according to claim 1, comprising clamping means for locking the indicator arm in position corresponding to a load placed on the scale, said sensing member comprising a pivotable arm adapted to be swung in the plane of rotation of said indicator until said pivotable arm contacts the locked indicator arm.

3. Price computing means according to claim 2, comprising a drive mechanism for swinging the pivotable arm of the sensing member, and impulse means for causing the clamping means and the drive mechanism for the pivotable sensing arm to be operative in response to the application of load on the scale.

4. Price computing means according to claim 3, in which the impulse means includes a driving motor, a time relay and an electric switch which starts the driving motor over the time relay.

5. Price computing means according to claim 1, comprising a pointer supported for pivotable movement and adapted for cooperating with a scale and a roller on said pointer resting against the periphery of one of the rolls, whereby said pointer will be turned in dependence on a change of the radius of said roll.

6. Price computing means according to claim 1, wherein the indicating member of the price indicating mechanism is an electric selector disk mounted to rotate together with one of the rolls and adapted for cooperating with selector contacts adapted to transfer price indications to a recording means.

7. Price computing means according to claim 1, comprising resilient means for urging the rotatably supported indicating member towards a zero position.

8. Price computing means according to claim 1, comprising means to stretch the strip between the rolls to hold the strip taut.

No references cited.